United States Patent Office 2,942,651
Patented June 28, 1960

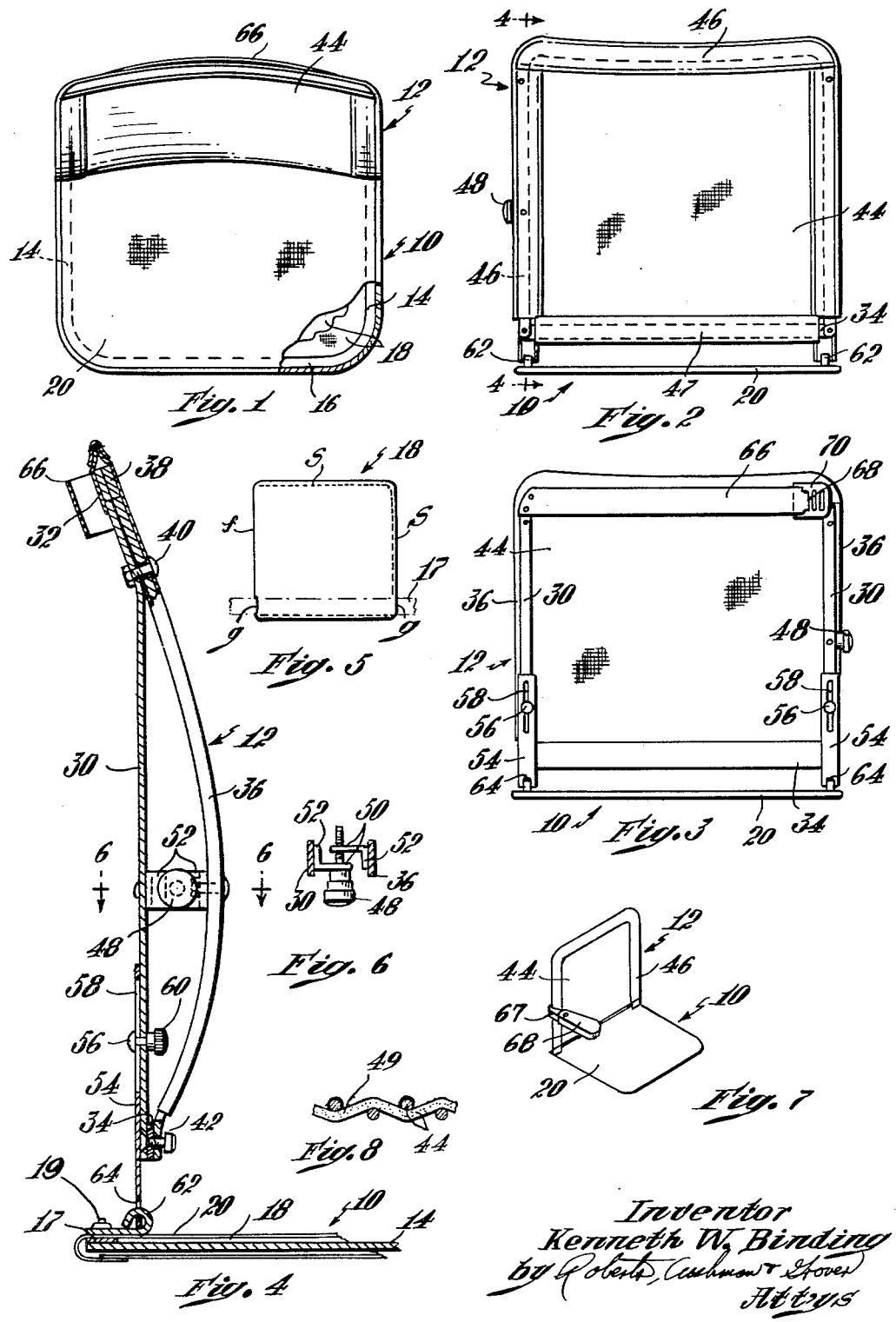

2,942,651

AUXILIARY SEAT

Kenneth W. Binding, Winchester, Mass., assignor to Market Forge Company, Everett, Mass., a corporation of Massachusetts Filed Nov. 12, 1957, Ser. No. 695,677

3 Claims. (Cl. 155—131)

This invention relates to an auxiliary support designed especially for use with an automobile seat, although it is to be understood that it may be used in conjunction with other supports upon which persons normally seat themselves.

The principal objects of the invention are to provide an auxiliary support which has broad bearing members for contact with the bottom and back of a seat or the like, which will support the occupant of a seat comfortably without sinking into the surfaces if the latter are yielding, thereby to maintain body contact with the seat at a minimum and hence to allow for greater access of air between the body and the seat surfaces without sacrificing the cushioning qualities of the seat, to provide a support which has a bottom designed to minimize lateral spread of the body when the latter is relaxed without imparting contractional forces lengthwise of the limbs and to provide a support which has a back which is adjustable to the back of each occupant individually for contour, height and seat depth. Other objects are to provide a support which will not slide around on the seat, which may be disposed so as to permit the occupant to recline in the seat and which is bucket-shaped so as to prevent the occupant from rolling from side to side when travelling around corners or when the occupant is asleep. Other objects are to provide a support which will yield under impact so as to avoid possible damage to the occupant, which is easy to adjust while in situ, which has an arm rest which may be transferred from one side to the other, according to the use of the seat, which is attractive in appearance, durable and so constructed as to be economical to manufacture.

As herein illustrated the support comprises a substantially flat bottom of broad area and a back rest hingedly connected thereto for disposition in an upright position with reference to the bottom, the back rest carrying a flexible member which is concave in transverse section, that is from side to side, and convex in longitudinal section, that is from top to bottom. The back rest is in the form of a rectangular frame mounting a flexible web which is held at its upper and lower edges by rearwardly concave top and bottom rails and at its side edges by forwardly convex side rails, the latter being adjustable to change the tautness of the web widthwise. The top and sides of the web are non-yieldably fastened to the frame and an elastic member yieldably connects the fourth side to the bottom rail and holds the web taut lengthwise. The back rest is adjustable heightwise with reference to the bottom member and movable angularly, and there is means accessible from the front side of the back rest for fixing its heightwise adjustment, and other means associated with the back of the back rest near the top for varying its angular disposition with reference to the bottom. The bottom member is constituted by a rigid frame of broad area which carries a cushion member composed of an inner member of woven fabric which may be elastic transversely of the frame but is inelastic from front to back, secured at its four sides to the frame and an outer covering member of non-elastic material secured to the four sides of the frame so as to cover the top and bottom sides of the inner fabric. Both the inner and outer members are porous and the outer member is preferably a woven fiberglass material.

The invention will now be described in greater detail with reference to the accompanying drawings, wherein:

Fig. 1 is a top view of the support looking down at the upper edge of the back and the upper surface of the bottom;

Fig. 2 is a front elevation of the seat looking directly at the front edge of the bottom and at the front surface of the back;

Fig. 3 is a rear elevation of the seat looking directly at the rear edge of the bottom and the rear side of the back;

Fig. 4 is a vertical section, to much larger scale, taken on the line 4—4 of Fig. 1;

Fig. 5 is a plan view of a part of the bottom;

Fig. 6 is a section taken on the line 6—6 of Fig. 4;

Fig. 7 is a perspective, to smaller scale, showing an arm rest; and

Fig. 8 is a greatly enlarged section through a portion of the fiberglass fabric showing a friction coating applied to one side.

Referring to the drawings, the support comprises a bottom 10, which is designed to rest upon the horizontal portion of any seat structure, whether it be an automobile set, chair, bench, or even the ground, and a back rest 12 connected at its lower edge to the rear edge of the bottom by means of hinges, which will be described hereinafter, so that it may be disposed upright to the bottom at a suitable angle for engagement with the back portion of the seat or with any other object which may be convenient for holding it upright. By reason of the hinges the bottom may be slid forwardly on the seat and the back rest disposed at a comfortably, rearwardly inclined angle so that an occupant may partially recline for sleeping.

The bottom is a substantially rectangular frame comprised of a U-shaped structure having laterally spaced, rigid side bars 14—14 connected at their forward ends by a transversely extending bar 16 which is integral therewith, and at their rear ends by a bar 17 fastened thereto by bolts 19.

A flexible seat is stretched across the frame 10 which is a composite of an inner envelope 18 (Fig. 5) and an outer envelope 20. The inner envelope 18 is made up of a woven fabric which is elastic in one direction and inelastic in the other direction and which, when stretched, is quite porous. Such fabrics are commonly used for making bathing suits. A length of the material is folded (Fig. 5) so that the elasticity is at right angles to the fold f and then a side adjacent the fold and a side opposite the fold are joined by stitching s to form an envelope open along a fourth side. This envelope is then slipped over the outside of the frame 10 from its front edge toward its rear edge before the bar 17 is bolted to the rear ends of side bars 14—14. The open edge is now sewn, leaving a narrow gap g at each side. The bar 17 is then thrust through the gaps so as to lie along the back seam, whereupon the envelope is pulled taut in a rearward direction and secured by fastening it to the rear ends of the bars 14—14 by means of the bolts 19. The outer envelope 20 is comprised of an inelastic woven fabric, for example a fiberglass fabric of a rather coarse mesh as compared to the inner member. A length of this fabric is folded, stitched along two sides so as to form an envelope open at one end and then the envelope is slipped over the frame and the inner envelope 18. The rear open end of the outer envelope is folded over the rear bar 17 of the frame onto the underside and secured thereto by appropriate means, such as by stitching or by adhesive tape. Preferably the edges of the outer envelope along the sides and front are bound with a decorative piping.

Optionally, the inner envelope may be omitted and the outer envelope mounted on the frame under widthwise tension so as to have substantially no stretch widthwise. The front and side edges of the envelope are mounted directly on the frame while the fourth side is connected to the rear side by an elastic tube under sufficient tension so that there is very little stretch from front to back. Since the frame is U-shaped the envelope may be stitched around all four sides and then slits may be made in its rear corners, whereupon one leg of the frame may be inserted through the slit and thrust entirely into the envelope so that it protrudes from the opposite slit, whereupon the rear side may be slipped through and fastened to the rear ends of the frame. A coarse mesh fabric layer may be placed between the top and bottom layers of the outside envelope to add thickness and cushioning characteristics to the bottom.

As thus constructed the bottom provides a broad supporting surface for contact with the seat of an automobile or other upholstered seat which will support the occupant without sinking into the upholstery. In fact, the bottom supports the person on the seat surface without substantial deflection thereof so that there is room for circulation of air through the pores and perforations in the bottom material to minimize perspiration and discomfort. The seat is particularly beneficial for use with the plastic seat covers that are now employed to a large extent for automobile seats. When the bottom incorporates the inner elastic envelope the contractional effect of the elastic tends to hold the buttocks from spreading and hence is especially beneficial to persons suffering from hemorrhoids and similar disorders. It is also extremely helpful and restful to women in advance pregnancy who find riding under ordinary conditions uncomfortable. When the bottom is comprised only of the outer envelope the transverse inelasticity of the bottom, although not contractional as is the elastic structure, does not yield widthwise and hence also prevents lateral spreading of the body.

The back rest 12 is substantially rectangular and is comprised of a U-shaped structure having laterally spaced, parallel rails 30—30, joined at their upper ends by a transversely extending top rail 32, which is integral with the side rails 30—30, and at their bottom ends by a transversely extending bottom rail 34 which is bolted at its ends to the side rails 30—30. A second U-shaped frame having transversely spaced rails 36—36, joined at their upper ends by a cross-rail 38, which is integral therewith, is mounted on the first U-shaped frame and secured thereto by bolts 40 and 42, the latter being the same that are employed for attaching the ends of the bottom cross-bar 34 to the side rails 30—30. The side rails 30—30 of the first U-shaped structure are straight except for their upper ends which are bent rearwardly at a small angle and the side rails 36—36 of the second U-shaped structure are bowed forwardly, that is, are rearwardly convex so that when the upper and lower ends of the second structure are fastened to the first structure the side rails 36—36 extend forwardly from the side rails 30—30, as clearly shown in Fig. 4. The curvature of the side rails 36—36 is chosen to conform closely to the average curvature of the contour of the back of a normal person. The top cross-bars 32 and 38, which coincide, and the bottom cross-bar 34 are also bowed, being forwardly concave, the curvature being chosen so that it corresponds substantially to the average transverse, that is, side to side curvature of the back.

One of the side rails 36, the right rail as seen in Fig. 2, is rigidly fastened at its upper and lower ends by the bolts 40 and 42 while the other, the left, is loosely fastened so that it can be deflected by laterally applied pressure to it to change the distance between the rails. To this end the bolt holes for the bolts 40 and 42, at this side, are slightly enlarged and the lower bolt is not drawn tight.

A woven web of glass fabric 44 is stretched across the back frame 12 with its top and bottom edges secured respectively, to the top and bottom rails 38 and 34 and to the side rails 36—36. This is accomplished by stitching lengths 46 of strong woven fabric of a decorative character along one edge to the top and side edges of the fabric, folding them about the rails and then stitching the opposite edges to the fabric at the back side. The lower edge of the woven fabric is fastened to the lower rail 34 by stitching it to a folded length of elastic material 47 and then sliding the lower rail 34 through it and fastening the rail at its ends to the side rails 36—36 so as to hold the web under tension. Preferably the web which is, as previously described, a woven glass fabric, is treated, for example with a coating of resinous material to make it less slippery so that the occupant will not slide and slip from side to side when resting against it. Fig. 8 shows a greatly enlarged fragmentary section of the fabric with such a coating applied to one side as at 49, it being understood that the coating may be applied to both sides if desired.

Tension widthwise of the back is effected by spreading the side rails as mentioned above and this is accomplished by means of a screw 48 (Figs. 4 and 6), threaded through laterally spaced portions 50 of a pair of brackets 52 fastened to the side rail 30 and the loosely fastened side rail 36. By rotating the screw the side rail 36 may be deflected so as to increase or decrease the spacing between the fixed and loose rails 36—36. The adjustment is located substantially at the apex of the rearwardly convex portion of the side rail and between the rails 30 and 36, so that it can be easily reached for manipulation.

By means of the screw 48 the transverse curvature of the back supporting web may be adjusted to fit the contour of the back. However it is necessary to raise and lower the back according to the height of the person. To this end the lower ends of the side rails 30—30 are adjustably fastened to straps 54—54 by means of bolts 56 which extend through slots 58 in the straps and through holes in the side rails 30 and clamp nuts 60 threaded on the bolts. By backing off the clamp nuts 60—60 to loosen the bolts the side rails 30—30 may be slid along the straps 54—54 to increase or decrease the elevation of the back rest. The clamp nuts 60—60 are located between the rails 30 and 36 and can be easily reached by the occupant without getting out of the seat to loose the connections so that the back frame can be elevated or lowered to just the right position and then locked in place. The straps 54—54 are hingedly connected at their lower ends to the rear end of the bottom by means of hooks 62—62 fastened to the bottom which extend through apertures 64—64 in the lower ends of the straps. The hooks 62 are spaced forwardly of the rear edge sufficiently, so that there is no danger of the occupant contacting the rear rail 17 even when the web spanning the back is at its maximum concavity. An additional advantage of locating the hooks forwardly of the rear rail 17 is that when the support is placed on the seat of an automobile the rearwardly extending portion of the bottom can be engaged beneath the lower edge of a back of a seat, thereby to assist in holding it firmly in place.

It is also desirable to be able to adjust the inclination or angle of the back rest with respect to the bottom and to the seat back and this is accomplished herein by means of a transversely extending spacer 66 fastened to one side of the frame near its top. The opposite end of the spacer is unconnected but may be engaged with one of a plurality of transversely spaced slots 68 in a locking plate 70, which is bolted to the back. By placing the free end of the spacer in one of the slots, it may be held bowed rearwardly so as yieldably to engage the back of the seat upon which the support is placed, thereby to hold the back rest forwardly of the back of the seat. The rearwardly curved surface of the spacer provides for a maximum freedom of adjustment without constraining the back rest hence it can yield easily to one side or the other of the line of contact of the spacer with the back of the seat.

The entire frame is made of a high carbon steel which will give maximum strength and at the same time will yield sufficiently under impact so that the occupant will not be injured in the event of an accident.

Optionally an arm rest may be employed, as shown in Fig. 7. To this end a bracket 66 is detachably fastened to the back side of one of the side rails 30 so as to extend around the edge and forwardly and on the bracket there is pivotally mounted on arm rest 68. The arm rest is pivoted so as to swing in a horizontal plane from a forwardly disposed operable position, laterally to an out-of-the-way position to permit the occupant to get out of his seat without difficulty. The bracket is fastened by a sliding clamp mounted on the rail 30 so that it may be adjusted heightwise and also transferred from one side to the other as desired.

It should be understood that the present disclosure is for the purpose of illustration only and that this invention includes all modifications and equivalents which fall within the scope of the appended claims.

I claim:

1. The combination of a seat and back rest hinged along adjacent edges, wherein the back rest comprises a pair of U-shaped frame members disposed one behind the other with their closed sides and legs in alignment, fastening means joining the legs at their closed ends, a stretcher bar disposed crosswise of the open ends of the frames between the legs of the front and rear frames, fastening means joining the legs of the front and rear frames to the ends of the stretcher bar, with that portion of the legs of the front frame between the fastening means arched forwardly from the legs of the rear frame for supporting a flexible web, a flexible web mounted on said forwardly arched leg, the forwardly arched leg at one side of the front frame being loosely fastened at its ends, a pair of brackets disposed between the legs of the front and rear frames at the side of the loosely fastened leg with overlapping transversely spaced portions containing aligned holes, one of which is threaded, and a screw bolt disposed in said holes in the brackets, rotatable to change the spacing between said spaced overlapping portions and by such change to change the transverse spacing between the legs of the front frame.

2. The combination of a seat and back rest hinged along adjacent edges wherein the back rest comprises a pair of U-shaped frame members disposed one behind the other with the closed sides and legs in alignment, the legs adjacent the closed side of the rear frame being bent rearwardly with respect to the plane of the legs, bolts fastening the unbent legs of the front frame to the rearwardly bent portions of the legs of the rear frame so that the legs of the front frame diverge from the legs of the rear frame, a stretcher bar disposed across the open ends of the rear frame between the legs of the front and rear frames, bolts joining the legs at the open ends of the frames to the stretcher bar so as to hold the legs of the front frame bowed forwardly with respect to the rear legs, the bolt holes in the rear legs and one of the front legs snugly engaging the bolts and the bolt holes in the other of the front legs loosely engaging the bolts, a web mounted on the forwardly bowed front legs, a pair of brackets disposed between the loosely fastened front leg and the rear leg behind it, said brackets having overlapping transversely spaced portions containing aligned holes, one of which is threaded, and a screw bolt disposed in said holes in the brackets rotatable to displace the front leg laterally relative to the rear leg.

3. The combination of a seat and back rest hinged along adjacent edges, wherein the back rest comprises a pair of U-shaped frame members disposed one behind the other, with the closed ends and legs in alignment, the closed ends being rearwardly transversely concave and having contact with each other, the legs of the rear frame adjacent the closed end of the frame being rearwardly bent away from the plane of the legs and the front legs diverging forwardly from the rear legs at the place of bending, bolts fastening the legs together adjacent the place of divergence, a stretcher bar disposed crosswise of the open ends of the frame between the legs of the front and rear frame, said stretcher bar being rearwardly transversely concave, bolts at the lower ends of the legs of the rear frame holding the lower ends of the legs of the front frame bowed rearwardly against the stretcher bar, a flexible web mounted on the forwardly bowed legs of the front frame, the bolt holes in the legs and the stretcher bar being snugly engaged except for the bolt holes in one of the legs of the front frame which are enlarged, a pair of brackets disposed between the leg having the enlarged holes in the front frame and the leg of the rear frame therebehind, said brackets having overlapping, transversely spaced portions containing aligned holes, one of which is threaded, and a screw bolt disposed in said holes rotatable to displace the loosely mounted front leg relative to the rigidly mounted front leg.

References Cited in the file of this patent

UNITED STATES PATENTS

| Number | Name | Date |
|---|---|---|
| 360,442 | Hyde et al. | Apr. 5, 1887 |
| 1,400,717 | Benson et al. | Dec. 20, 1921 |
| 1,412,037 | Beyon | Apr. 11, 1922 |
| 1,444,014 | Truesdell | Feb. 6, 1923 |
| 1,707,913 | Knight | Apr. 2, 1929 |
| 1,999,560 | Brueckl | Apr. 30, 1935 |
| 2,071,988 | Sasse | Feb. 23, 1937 |
| 2,108,242 | Wallace | Feb. 15, 1938 |
| 2,491,784 | Thompson | Dec. 20, 1949 |
| 2,605,818 | Dabbs et al. | Aug. 5, 1952 |
| 2,663,359 | Wood | Dec. 22, 1953 |
| 2,694,441 | Degenfelder | Nov. 16, 1954 |
| 2,756,808 | Eichorst | July 31, 1956 |

FOREIGN PATENTS

| Number | Country | Date |
|---|---|---|
| 2,598 | Great Britain | Feb. 6, 1899 |
| 181,203 | Austria | Feb. 25, 1955 |
| 508,069 | Canada | Dec. 14, 1954 |